(12) United States Patent
Cho et al.

(10) Patent No.: US 10,399,559 B2
(45) Date of Patent: Sep. 3, 2019

(54) SYSTEM AND METHOD OF CONTROLLING ENGINE CLUTCH ENGAGEMENT DURING TCS OPERATION OF HYBRID VEHICLE

(71) Applicants: Hyundai Motor Company, Seoul (KR); Kia Motors Corporation, Seoul (KR)

(72) Inventors: Teh Hwan Cho, Gyeonggi-do (KR); Sang Joon Kim, Seoul (KR); Gwang Il Du, Incheon (KR); Ji Hoon Kang, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 324 days.

(21) Appl. No.: 15/363,824

(22) Filed: Nov. 29, 2016

(65) Prior Publication Data
US 2018/0056980 A1 Mar. 1, 2018

(30) Foreign Application Priority Data
Aug. 26, 2016 (KR) .......................... 10-2016-0109347

(51) Int. Cl.
*B60W 20/40* (2016.01)
*B60W 20/15* (2016.01)
(Continued)

(52) U.S. Cl.
CPC ............ *B60W 20/40* (2013.01); *B60K 6/442* (2013.01); *B60K 28/16* (2013.01); *B60K 28/165* (2013.01);
(Continued)

(58) Field of Classification Search
USPC .......................................................... 701/22
See application file for complete search history.

(56) References Cited

U.S. PATENT DOCUMENTS

| | | | | |
|---|---|---|---|---|
| 2002/0107628 A1* | 8/2002 | Sakakiyama | .......... | B60K 23/08 701/89 |
| 2010/0298092 A1* | 11/2010 | Tsuchikawa | ........... | B60K 6/365 477/71 |
| 2015/0166044 A1* | 6/2015 | Kim | ......................... | B60K 6/48 701/22 |

FOREIGN PATENT DOCUMENTS

| | | |
|---|---|---|
| JP | 2007-331418 A | 12/2007 |
| JP | 2012-081819 A | 4/2012 |

(Continued)

*Primary Examiner* — Lail A Kleinman
*Assistant Examiner* — Mahmoud M Kazimi
(74) *Attorney, Agent, or Firm* — Mintz Levin Cohn Ferris Glovsky and Popeo, P.C.; Peter F. Corless

(57) ABSTRACT

A system and method of controlling engine clutch engagement during TCS operation of a hybrid vehicle are provided. The method includes determining whether a TCS is operating and upon determining that the TCS is operating, determining a compensation value for early engagement of an engine clutch during the TCS operation based on a difference between a front wheel speed and a rear wheel speed and a slip amount of front wheels. Additionally, the method includes determining whether engagement of the engine clutch is capable of being started based on the compensation value and starting the engine clutch engagement. Since the engagement of the engine clutch is controlled based on the speed of non-drive wheels during TCS operation, the engagement stability of the engine clutch is improved and the amount of time required to engage the engine clutch is decreased.

12 Claims, 5 Drawing Sheets

(51) Int. Cl.
*B60W 10/08* (2006.01)
*B60W 10/06* (2006.01)
*B60W 10/02* (2006.01)
*B60K 28/16* (2006.01)
*B60K 6/442* (2007.10)
*F16D 48/06* (2006.01)

(52) U.S. Cl.
CPC ............ *B60W 10/02* (2013.01); *B60W 10/06* (2013.01); *B60W 10/08* (2013.01); *B60W 20/15* (2016.01); *F16D 48/06* (2013.01); *B60W 2510/0638* (2013.01); *B60W 2520/263* (2013.01); *B60W 2520/28* (2013.01); *B60W 2710/021* (2013.01); *B60Y 2200/92* (2013.01); *B60Y 2300/1884* (2013.01); *B60Y 2300/18175* (2013.01); *B60Y 2300/42* (2013.01); *F16D 2500/1066* (2013.01); *F16D 2500/10412* (2013.01); *F16D 2500/3067* (2013.01); *F16D 2500/3115* (2013.01); *F16D 2500/3118* (2013.01); *F16D 2500/5048* (2013.01); *F16D 2500/5075* (2013.01); *F16D 2500/70426* (2013.01); *Y02T 10/6234* (2013.01); *Y02T 10/6286* (2013.01); *Y10S 903/912* (2013.01); *Y10S 903/946* (2013.01)

(56) References Cited

FOREIGN PATENT DOCUMENTS

| JP | 2012-116307 A | 6/2012 |
| JP | 5401999 B2 | 1/2014 |
| JP | 2015-058869 A | 3/2015 |
| JP | 5760378 B2 | 8/2015 |
| KR | 10-2009-0062246 A | 6/2009 |
| KR | 10-1583973 B1 | 1/2016 |

* cited by examiner

SYSTEM AND METHOD OF CONTROLLING ENGINE CLUTCH ENGAGEMENT DURING TCS OPERATION OF HYBRID VEHICLE

CROSS-REFERENCE TO RELATED APPLICATION

This application claims under 35 U.S.C. § 119(a) the benefit of priority to Korean Patent Application No. 10-2016-0109347 filed on Aug. 26, 2016, the entire contents of which are incorporated herein by reference.

BACKGROUND

(a) Technical Field

The present disclosure relates to a system and method of controlling engine clutch engagement during traction control system (TCS) operation of a hybrid vehicle, and more particularly, to a system and method of controlling engine clutch engagement during TCS operation of a hybrid vehicle, capable of improving the engagement stability and decreasing the engagement time of an engine clutch during TCS operation of a hybrid vehicle.

(b) Background Art

Hybrid vehicles and plug-in hybrid vehicles are environmentally friendly vehicles capable of reducing emissions and improving fuel efficiency by utilizing both an engine and a motor as power sources, and are equipped with a power transmission system for selectively transmitting either engine power or motor power to drive wheels or transmitting both engine power and motor power together to drive wheels.

As illustrated in FIG. 1, an exemplary power transmission system of such a hybrid vehicle according to the related art, which is an environmentally friendly vehicle, includes an engine 10 and a motor 12, which are arranged in series, an engine clutch 13 disposed between the engine 10 and the motor 12 to transmit the engine power or interrupt the transmission of the engine power, an automatic transmission 14, which transmits the power of the motor or the power of both the motor and the engine to drive wheels while changing the shift range, a hybrid starter generator (HSG) 16, which is connected to a crank pulley of the engine to transmit and receive the power and has the configuration of a motor to generate electricity for engine start and battery charge, an inverter 18, which operates the motor and executes the electricity generation, and a high-voltage battery 20, connected to the inverter to be charged and discharged to supply electric power to the motor 12.

Driving modes of such a hybrid vehicle include an EV driving mode, in which the vehicle travels by the motor power, and an HEY driving mode, in which the vehicle travels by both the engine power and the motor power in the state in which the engine clutch is engaged. The engine clutch 13 is operated corresponding to an actuator stroke, which is set by an engine clutch transmission torque command of a hybrid control unit (HCU), which is a high-level controller, to engage the engine clutch 13 in the HEV driving mode, and the engagement is released in the EV driving mode.

The hybrid vehicle includes a traction control system (TCS), which is a safety system that prevents wheel spin and improves driving stability by autonomously operating the brakes and adjusting the motor torque when the vehicle starts or accelerates on a snowy road, an icy road or an uneven road surface. When the hybrid vehicle starts or accelerates on a slippery road and thus wheel slip occurs due to the application of excessive driving force, the TCS generates a request for torque reduction, and accordingly, the hybrid control unit (HCU), which is a high-level controller, performs torque reduction control for stable travel.

In other words, in response to the received TCS-demanded torque request, the high-level controller is configured to perform torque intervention control, which reduces the motor torque to respond rapidly to the request for torque reduction. For example, when the TCS-demanded torque is transmitted to the high-level controller during the TCS operation, the high-level controller is configured to perform torque intervention control, which reduces the motor torque without changing the engine torque.

However, while the engine clutch engagement control is performed during the TCS operation, when the motor speed (e.g., the motor speed that is applied to drive wheels, e.g. front wheels) changes suddenly due to reduced frictional force on the road surface, a difference occurs between the engine speed and the motor speed, which leads to deterioration of engagement stability of the engine clutch and delay of engagement of the engine clutch. In other words, the engine clutch is engaged stably when the engine speed and the motor speed are in a synchronized state, however, as described above, a sudden change in the motor speed causes a difference between the engine speed and the motor speed, thereby reducing the engagement stability of the engine clutch and delaying the engagement of the engine clutch.

The above information disclosed in this section is merely for enhancement of understanding of the background of the invention and therefore it may contain information that does not form the prior art that is already known in this country to a person of ordinary skill in the art.

SUMMARY

The present invention provides a method of controlling engine clutch engagement during TCS operation of a hybrid vehicle, which differs from a conventional method of controlling engine clutch engagement based on the speed of drive wheels (front wheels) (=a motor speed) during TCS operation, and in which the engagement of an engine clutch is controlled based on the speed of non-drive wheels (rear wheels) during TCS operation, thereby improving the engagement stability of the engine clutch and decreasing the amount of time taken to engage the engine clutch.

In one aspect, the present invention provides a method of controlling engine clutch engagement during TCS operation of a hybrid vehicle that may include: determining whether a TCS is operating, in response to determining that the TCS is operating, determining a compensation value for early engagement of an engine clutch during the TCS operation based on a difference between a front wheel speed and a rear wheel speed and a slip amount of front wheels, and determining whether engagement of the engine clutch is capable of being started based on the compensation value and starting the engine clutch engagement.

In an exemplary embodiment, the determination of the compensation value for engine clutch engagement control during the TCS operation may include calculating the difference between the front wheel speed and the rear wheel speed and comparing the difference with the slip amount of the front wheels (drive wheels). In addition, as the difference between the front wheel speed and the rear wheel speed increases to be greater than the slip amount of the front wheels (drive wheels), the compensation value increases, and as the difference between the front wheel speed and the rear wheel speed decreases to be less than the slip amount of the front wheels (drive wheels), the compensation value decreases.

Further, the determination of whether the engagement of the engine clutch is capable of being started may include comparing a difference between an engine speed and a motor speed, the motor speed being the front wheel speed, with a sum of a relative speed set to enable the engine clutch engagement and the compensation value, and, when the difference between the engine speed and the motor speed is less than the sum of the relative speed and the compensation value, determining that engagement of the engine clutch is capable of being started. The method may further include, after the determination of whether the engagement of the engine clutch is capable of being started based on the compensation value, determining whether it is possible to prevent engine stall before starting the engine clutch engagement.

In another exemplary embodiment, the determination of whether it is possible to prevent the engine stall may include comparing rear motor speed which is an input shaft speed (motor speed) that is not real motor speed and calculated based on the rear wheel speed with an engine stall-preventing engine speed set based on the rear wheel speed, and, when the rear motor speed is greater than the engine stall-preventing engine speed, determining that it is possible to prevent the engine stall.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
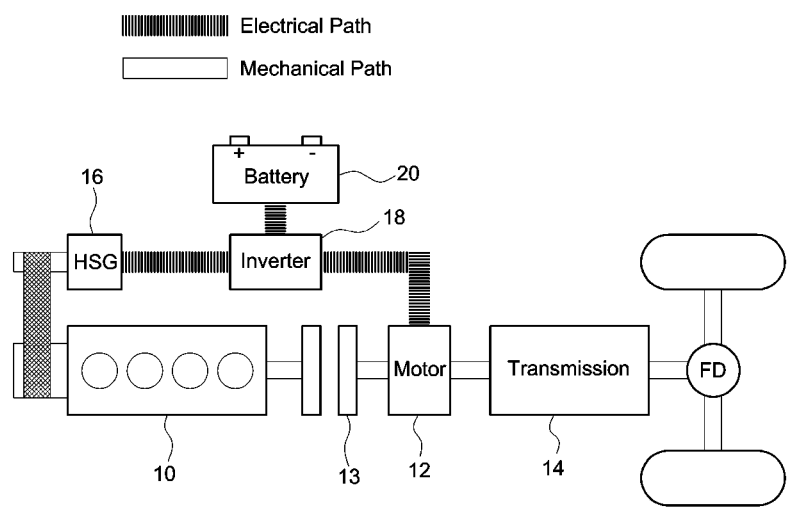
FIG. 1 is a schematic view illustrating an exemplary power transmission system of a hybrid vehicle according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 2:
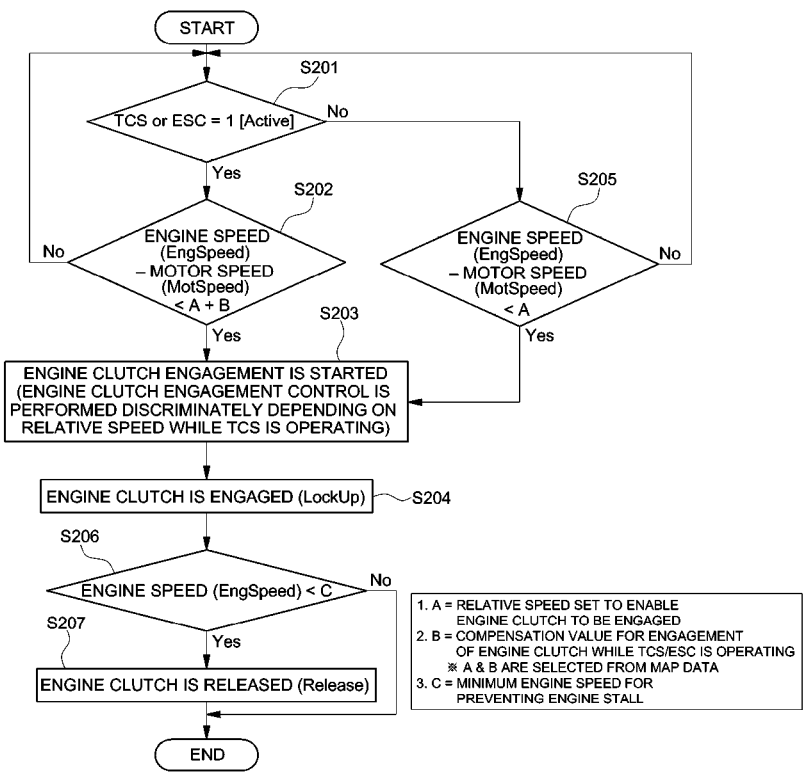
FIG. 2 is a flowchart illustrating a conventional method of controlling engine clutch engagement during TCS operation of a hybrid vehicle according to the related art.
Figure 3:
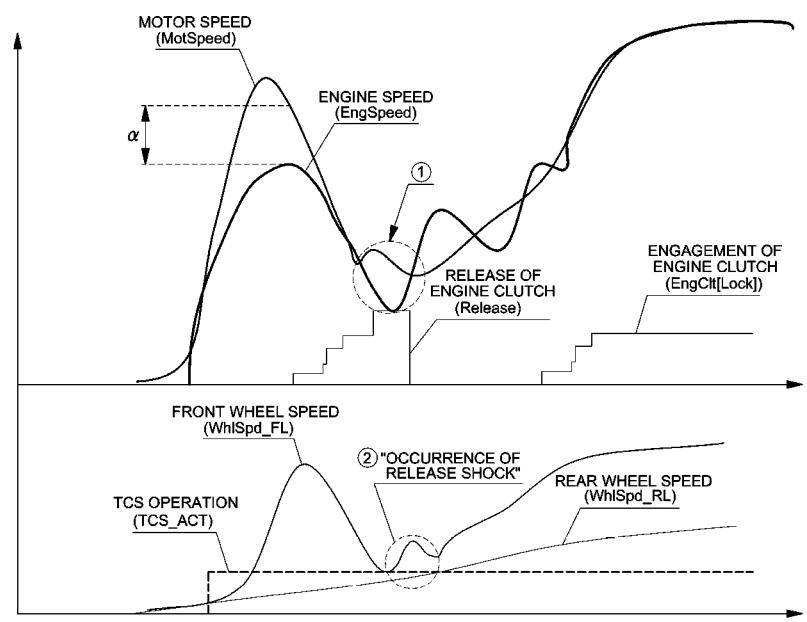
FIG. 3 is a control graph illustrating a conventional method of controlling engine clutch engagement during TCS operation of a hybrid vehicle according to the related art.

In order to help understand the present invention, a conventional method of controlling engine clutch engagement during TCS operation will now be explained with reference to FIGS. 2 and 3.

First, a high-level controller of the hybrid vehicle is configured to determine whether a TCS is operating (S201). For reference, an electronic stability control (ESC) system is a system for adjusting the orientation of the vehicle body to prevent the vehicle from slipping, like the TCS. In a vehicle equipped with such an ESC, the high-level controller may be configured to determine whether the ESC is operating. In response to determining that the TCS is operating, the high-level controller is configured to determine whether an engine clutch is capable of being engaged based on the difference (denoted by a in FIG. 3) between the engine speed EngSpeed and the motor speed MotSpeed. Since the power of the motor is output to the front wheels, the motor speed MotSpeed is the same as the wheel speed of the front wheels WhlSpd_FL, whereby whether the engine clutch is capable of being engaged may be determined based on the difference between the engine speed EngSpeed and the wheel speed of the front wheels WhlSpd_FL.

The difference between the engine speed EngSpeed and the motor speed MotSpeed is compared with the sum of a relative speed A, at which the engine clutch is capable of being engaged, and a compensation value B set for early engagement of the engine clutch in the TCS operation (S202). When the difference between the engine speed EngSpeed and the motor speed MotSpeed is less than the sum, the controller is configured to determine that the engine clutch is capable of being engaged, and the engine clutch engagement control is started (S203).

Subsequently, the engagement of the engine clutch LockUp is achieved by the engine clutch engagement control (S204). For example, when the high-level controller transmits an engine clutch engagement control command to the engine ECU, the engine ECU is configured to engage the engine clutch. While the TCS is operating, engine clutch engagement control is performed based on the relative speed (e.g., the engine speed relative to the motor speed) using map data to synchronize the engine speed and the motor speed.

However, even though the engine clutch engagement control is performed based on the relative speed using map data during the TCS operation, when the motor speed (e.g., the motor speed applied to the front wheels, which are drive wheels) changes suddenly due to reduced frictional force on the road surface, a difference rapidly occurs between the engine speed and the motor speed (refer to the portion indicated by ① in FIG. 3) and a shock leading to engagement release occurs during the process of engaging the engine clutch (refer to the portion indicated by ② in FIG. 3), which leads to deterioration of the engagement stability of the engine clutch and delayed engagement of the engine clutch.

Meanwhile, in response to determining that the TCS is not operating at step S201, the controller is configured to determine whether the difference between the engine speed EngSpeed and the motor speed MotSpeed is less than the relative speed A, at which the engine clutch is capable of being engaged (S205). When the difference between the engine speed EngSpeed and the motor speed MotSpeed is less than the relative speed A, the process proceeds to step S203 and the engine clutch engagement control is performed. After the engine clutch engagement, the engine ECU is configured to determine whether the engine speed is less than a minimum engine speed C for preventing engine stall (S206). In response to determining that the engine speed is less than the minimum engine speed C, the engine ECU is configured to determine that the HEY driving mode is to be released and perform engine clutch engagement release control (S207).

Figure 6:
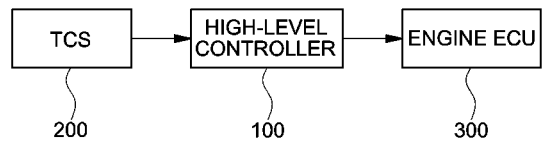
FIG. 6 is a constitutional view of a system of controlling engine clutch engagement during TCS operation of a hybrid vehicle according to an exemplary embodiment of the present invention.

Hereinafter, a system of controlling the engine clutch engagement during the TCS operation of the hybrid vehicle according to the present invention will be described with reference to FIG. 6. Reference numeral 100 in FIG. 6 denotes a high-level controller of the hybrid vehicle.

The high-level controller 100 is a highest-level controller of the hybrid vehicle, configured to transmit a control command to a variety of electronic components and a variety of controllers (e.g., an engine ECU, a motor controller, etc.). A TCS 200 is electrically connected to an input terminal of the high-level controller 100 to transmit and receive electric signals, and an engine ECU 300 is electrically connected to an output terminal of the high-level controller 100 to transmit and receive electric signals.

The TCS 200 is a safety system for preventing wheel spin and improving driving stability by autonomously operating the brakes and adjusting the motor torque when the vehicle starts or accelerates on a snowy road, an icy road or an uneven road surface. Such a TCS transmits an electric signal indicating whether the TCS is operating to the high-level controller 100. The engine ECU 300 is configured to execute the engagement or release of the engine clutch based on the engine clutch engagement control command transmitted from the high-level controller 100.

Figure 4:
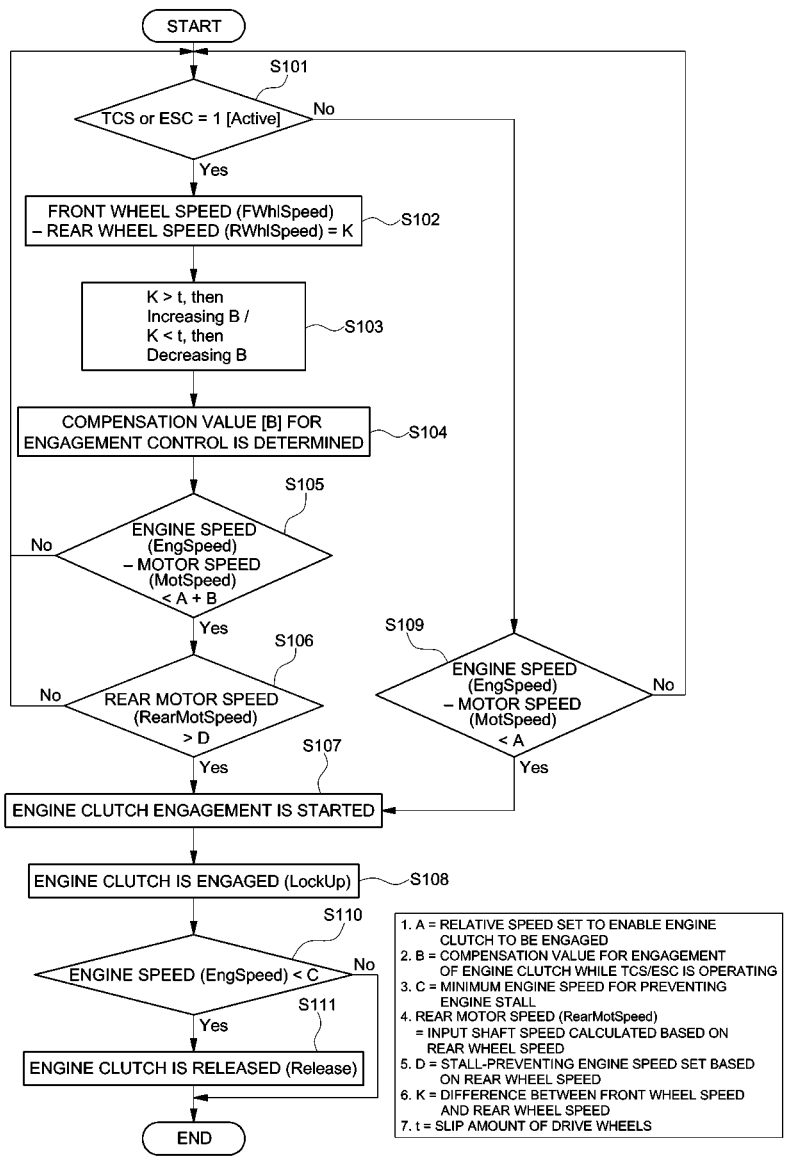
FIG. 4 is a flowchart illustrating a method of controlling engine clutch engagement during TCS operation of a hybrid vehicle according to an exemplary embodiment of the present invention.
Figure 5:
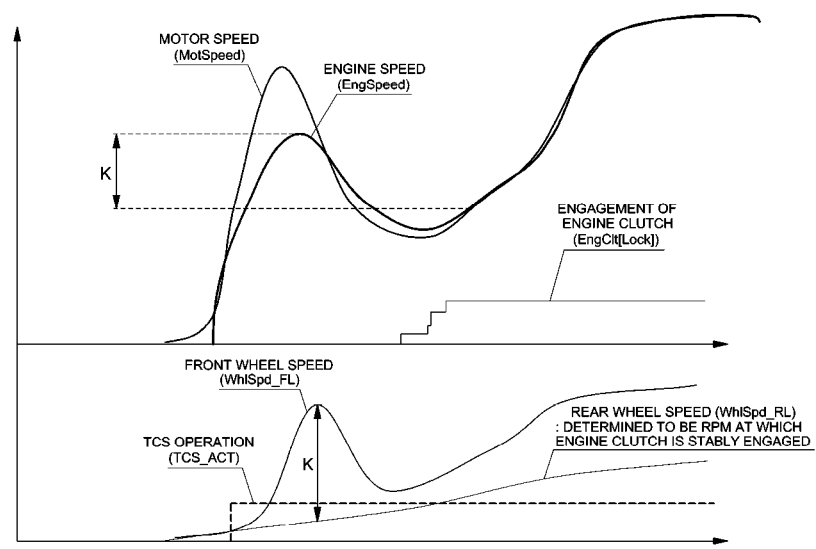
FIG. 5 is a control graph illustrating a method of controlling engine clutch engagement during TCS operation of a hybrid vehicle according to an exemplary embodiment of the present invention.

The method of controlling engine clutch engagement during the TCS operation of the hybrid vehicle having the above-described constitution according to an exemplary embodiment the present invention will now be described. FIGS. 4 and 5 are respectively a flowchart and a control graph illustrating the method of controlling engine clutch engagement during the TCS operation of the hybrid vehicle according to the present invention.

First, the high-level controller of the hybrid vehicle may be configured to determine whether the TCS is operating (S101). For reference, an electronic stability control (ESC) system is a system for adjusting the orientation of the vehicle body to prevent the vehicle from slipping, like the TCS. In a vehicle equipped with such an ESC, the high-level controller may be configured to determine whether the ESC is operating.

In response to determining that the TCS is operating at step S101, the high-level controller may be configured to determine a compensation value B for early engagement of the engine clutch in the TCS operation using a difference K between a front wheel speed FWhlSpeed and a rear wheel speed RWhlSpeed and a slip amount t of the front wheels (drive wheels). Since the front wheels are drive wheels to which the motor speed is applied, the front wheel speed is the same as the motor speed, and the rear wheels are non-drive wheels.

When the slip amount t of the front wheels (drive wheels) to which the motor speed is applied changes based on conditions of the road surface, a difference occurs between the front wheel speed and the rear wheel speed. Therefore, through the step (S102) of calculating the difference K between the front wheel speed FWhlSpeed and the rear wheel speed RWhlSpeed and the step (S103) of comparing the difference K with the slip amount t of the front wheels (drive wheels), the compensation value B for engine clutch engagement control during the TCS operation may be determined (S104).

For example, when the detection values of a front wheel speed sensor and a rear wheel speed sensor are transmitted to the high-level controller and the detection values of the front wheel slip amount sensor are transmitted to the high-level controller, the high-level controller may be configured to calculate the difference K between the front wheel speed FWhlSpeed and the rear wheel speed RWhlSpeed and compare the difference K with the slip amount t of the front wheels (drive wheels), thereby determining the compensation value B for engine clutch engagement control during the TCS operation.

In particular, in the comparison process at step S103, as the difference K between the front wheel speed and the rear wheel speed increase to be greater than the slip amount t of the front wheels (drive wheels), the compensation value B may be determined as an increased value at step S104. Conversely, as the difference K between the front wheel speed and the rear wheel speed decreases to be less than the slip amount t of the front wheels (drive wheels), the compensation value B may be determined as a decreased value at step S104.

Accordingly, as the difference K between the front wheel speed and the rear wheel speed decreases to be less than the slip amount t of the front wheels (drive wheels), the inertia of the front wheels (drive wheels) is small even when the engagement of the engine clutch is performed more rapidly, which leads to a decrease in the size of a shock upon engagement of the engine clutch. When the difference K between the front wheel speed and the rear wheel speed increases to be greater than the slip amount t of the front wheels (drive wheels), the inertia of the front wheels (drive wheels) increases. A shock attributable to engagement of the engine clutch may be reduced by, for example, delaying the engagement of the engine clutch.

In the conventional method of controlling the engagement of the engine clutch during TCS operation, the compensation value B for early engagement of the engine clutch during TCS operation is selected from map data. However, as described above, according to the present invention, the compensation value B for engine clutch engagement control during the TCS operation may be determined in consideration of the slip amount t of the drive wheels due to reduced frictional force on the road surface and the inertia at the time when the drive wheels slip, thereby decreasing the engagement start time for the engine clutch and reducing the shock attributable to engagement of the engine clutch.

Subsequently, the difference between the engine speed EngSpeed and the motor speed MotSpeed, which is the front wheel speed, may be compared with the sum of a relative speed A, at which the engine clutch is capable of being engaged, and the compensation value B, determined as above (S105). When the difference between the engine speed EngSpeed and the motor speed MotSpeed, which is the front wheel speed, is less than the sum of the relative speed A, at which the engine clutch is capable of being engaged, and the compensation value B, determined as above, the controller may be configured to determine that the engine clutch is capable of being engaged, and the engagement of the engine clutch may be started.

Particularly, before the engagement of the engine clutch is started, the controller may be configured to determine whether it is possible to prevent engine stall. In other words, to determine a section (e.g., time range) in which the engine clutch is capable of being stably engaged during TCS operation, the controller may be configured to determine whether it is possible to prevent engine stall based on a rear motor speed RearMotSpeed, i.e., an input shaft speed (motor speed), which is not the actual motor speed but is calculated based on the rear wheel speed.

When the front wheels (drive wheels) decelerate rapidly according to the TCS control or the state of the road surface under the condition that the rear wheel speed is less than an engine idle revolutions per minute (RPM), the engine speed may decrease below the idle speed, and thus engine stall may occur. Therefore, the reason for determining whether it is possible to prevent engine stall is to achieve the engagement of the engine clutch under stable circumstances under which engine stall is preventable.

Accordingly, the rear motor speed RearMotSpeed, i.e., the input shaft speed (motor speed), which is not the actual motor speed but is calculated based on the rear wheel speed, may be compared with an engine stall-preventing engine speed, which is set based on the rear wheel speed (S106). When the rear motor speed RearMotSpeed is greater than the engine stall-preventing engine speed, the controller may be configured to determine that engine stall is preventable, and the engagement of the engine clutch may be started (S107).

When the motor speed (e.g., the motor speed applied to the front wheels, which are drive wheels) changes suddenly due to reduced frictional force on the road surface, the speed of the front wheels (drive wheels) also changes suddenly, but the speed of the rear wheels does not change suddenly (e.g., remains steady) since the rear wheels are non-drive wheels. Accordingly, the controller may be configured to determine whether the engine clutch is capable of being stably engaged based on the speed of the rear wheels (non-drive wheels), whereby the engine power may be output stably even when the front wheel speed decreases according to TCS operation. Subsequently, the engagement of the engine clutch LockUp may be achieved by the engine clutch engagement control (S108). For example, when the high-level controller transmits an engine clutch engagement control command to the engine ECU, the engine ECU may be configured to engage the engine clutch.

Meanwhile, in response to determining that the TCS is not operating at step S101, the controller may be configured to determine whether the difference between the engine speed EngSpeed and the motor speed MotSpeed is less than the relative speed A, at which the engine clutch is capable of being engaged (S109). When the difference between the engine speed EngSpeed and the motor speed MotSpeed is less than the relative speed A, the process may proceed to step S107 and the engine clutch engagement control may be performed. After the engine clutch engagement, the engine ECU may be configured to determine whether the engine speed is less than a minimum engine speed C for preventing engine stall (S110). In response to determining that the engine speed is less than the minimum engine speed C, the engine ECU may be configured to determine that the HEY driving mode is to be released and perform engine clutch engagement release control (S111).

As is apparent from the above description, the present invention provides a method of controlling engine clutch engagement during TCS operation of a hybrid vehicle that has following effects.

First, in the conventional method of controlling engine clutch engagement during the TCS operation, the compensation value B for early engagement of the engine clutch during the TCS operation is merely selected from map data. However, according to the present invention, the compensation value B for engine clutch engagement control during the TCS operation may be determined based on the difference K between the speeds of the front wheels and the rear wheels and the slip amount t of the front wheels (drive wheels) in consideration of the inertia of the front wheels (drive wheels), thereby more accurately determining a section in which the engine clutch is capable of being stably engaged during TCS operation and more rapidly engaging the engine clutch than in the prior art.

Second, when the motor speed (e.g., the motor speed that is applied to the front wheels, which are drive wheels) changes suddenly due to reduced frictional force on the road surface, the speed of the front wheels (drive wheels) also changes suddenly, but the speed of the rear wheels does not change suddenly since the rear wheels are non-drive wheels. Accordingly, whether the engine clutch is capable of being stably engaged may be determined based on the speed of the rear wheels (non-drive wheels), whereby the engine power may be output stably even when the front wheel speed decreases according to TCS operation.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method of controlling engine clutch engagement during traction control system (TCS) operation of a hybrid vehicle, comprising:
   determining, by a high-level controller of the hybrid vehicle, whether a TCS is operating;
   in response to determining that the TCS is operating, determining, by the high-level controller, a compensation value for engine clutch engagement control during the TCS operation based on a difference between a front wheel speed and a rear wheel speed and a slip amount of front wheels;
   determining, by the high-level controller, whether engagement of the engine clutch is capable of being started based on the compensation value and starting the engine clutch engagement; and
   engaging, by an engine electronic control unit (ECU), the engine clutch in response to receiving an engine clutch engagement control signal from the high-level controller.

2. The method of claim 1, wherein the determination of the compensation value for engine clutch engagement control during the TCS operation includes:
   calculating, by the high-level controller, the difference between the front wheel speed and the rear wheel speed; and
   comparing, by the high-level controller, the difference with the slip amount of the front wheels.

3. The method of claim 2, wherein, as the difference between the front wheel speed and the rear wheel speed increases to be greater than the slip amount of the front wheels, the compensation value increases, and as the difference between the front wheel speed and the rear wheel speed decreases to be less than the slip amount of the front wheels, the compensation value decreases.

4. The method of claim 1, wherein the determination of whether the engagement of the engine clutch is capable of being started includes:
   comparing, by the high-level controller, a difference between an engine speed and a motor speed, the motor speed being the front wheel speed, with a sum of a relative speed that enables the engine clutch engagement and the compensation value; and
   when the difference between the engine speed and the motor speed is less than the sum of the relative speed and the compensation value, determining, by the high-level controller, that engagement of the engine clutch is capable of being started.

5. The method of claim 1, further comprising:
   after determining whether the engagement of the engine clutch is capable of being started based on the compensation value, determining, by the high-level controller, whether it is possible to prevent engine stall before starting the engine clutch engagement.

6. The method of claim 5, wherein the determination of whether it is possible to prevent the engine stall includes:
   comparing, by the high-level controller, a rear motor speed represented by an input shaft speed that is calculated based on the rear wheel speed with an engine stall-preventing engine speed set based on the rear wheel speed; and
   when the rear motor speed is greater than the engine stall-preventing engine speed, determining, by the high-level controller, that it is possible to prevent the engine stall.

7. A system of controlling engine clutch engagement during traction control system (TCS) operation of a hybrid vehicle, comprising:
   a memory configured to store program instructions; and
   a processor configured to execute the program instructions, the program instructions when executed configured to:
   determine whether a TCS is operating;
   determine a compensation value for engine clutch engagement control during the TCS operation based on a difference between a front wheel speed and a rear wheel speed and a slip amount of front wheels in response to determining that the TCS is operating;
   determine whether engagement of the engine clutch is capable of being started based on the compensation value and starting the engine clutch engagement; and
   engage the engine clutch based on a signal transmitted to an engine electronic control unit (ECU).

8. The system of claim 7, wherein the program instructions when executed that determine the compensation value for engine clutch engagement control during the TCS operation are further configured to:
   calculate the difference between the front wheel speed and the rear wheel speed; and
   compare the difference with the slip amount of the front wheels.

9. The system of claim 8, wherein, as the difference between the front wheel speed and the rear wheel speed increases to be greater than the slip amount of the front wheels, the compensation value increases, and as the difference between the front wheel speed and the rear wheel speed decreases to be less than the slip amount of the front wheels, the compensation value decreases.

10. The system of claim 7, wherein the program instructions when executed that determine whether the engagement of the engine clutch is capable of being started are further configured to:
    compare a difference between an engine speed and a motor speed, the motor speed being the front wheel speed, with a sum of a relative speed that enables the engine clutch engagement and the compensation value; and
    determine that engagement of the engine clutch is capable of being started when the difference between the engine speed and the motor speed is less than the sum of the relative speed and the compensation value.

11. The system of claim 7, wherein the program instructions when executed are further configured to:
   determine whether it is possible to prevent engine stall before starting the engine clutch engagement after determining whether the engagement of the engine clutch is capable of being started based on the compensation value.

12. The system of claim 11, wherein the program instructions when executed that determine whether it is possible to prevent the engine stall are further configured to:
   compare a rear motor speed represented by an input shaft speed that is calculated based on the rear wheel speed with an engine stall-preventing engine speed set based on the rear wheel speed; and
   determine that it is possible to prevent the engine stall when the rear motor speed is greater than the engine stall-preventing engine speed.

* * * * *